United States Patent [19]
Lassila et al.

[11] Patent Number: 5,939,476
[45] Date of Patent: Aug. 17, 1999

[54] SURFACE TENSION REDUCTION WITH ALKYLATED POLYAMINES

[75] Inventors: Kevin Rodney Lassila, Macungie; Kristen Elaine Minnich; Richard Van Court Carr, both of Allentown, all of Pa.

[73] Assignee: Air Products and Chemicals, Inc., Allentown, Pa.

[21] Appl. No.: 08/968,224

[22] Filed: Nov. 12, 1997

[51] Int. Cl.$^6$ .............................. C08L 79/02; C09D 5/14; C09D 11/02; C09D 179/02
[52] U.S. Cl. ................... 524/251; 106/31.64; 106/31.75; 106/31.89; 427/411; 523/160; 523/161; 524/252
[58] Field of Search ...................... 523/160, 161; 524/250, 251, 252; 427/411; 106/31.03, 31.61, 31.64, 31.75, 31.89

[56] References Cited

U.S. PATENT DOCUMENTS

| | | | |
|---|---|---|---|
| 2,267,205 | 12/1941 | Kyrides | 252/152 |
| 4,126,640 | 11/1978 | Floyd | 260/583 R |
| 4,195,152 | 3/1980 | Floyd | 528/87 |
| 5,098,478 | 3/1992 | Krishman et al. | 106/23 |
| 5,562,762 | 10/1996 | Mrvos et al. | 106/22 |
| 5,707,638 | 1/1998 | Losel et al. | 424/407 |
| 5,804,640 | 9/1998 | Laura et al. | 524/507 |

OTHER PUBLICATIONS

Schwartz, J., "The Importance of Low Dynamic Surface Tension in Waterborne Coatings" Journal of Coating Technology, Sep. 1992.

Murata, Y., Ueda, M., "Antimicrobal Property of N–alkyldiethylenetriamines and N–acyldiethylenetriamines Against Some Dental Plaque Bacteria" Soc. Antibact. Antifung. Agents, Jpn., 1989.

Wirth, W., Storp, S. and Jacobnson, W., "Mechanisms Controlling Leaf Retention of Agricultural Spray Solutions", Pestic. Sci. 1991, 33, 411–420.

Medina, S. W. Sutovich, "Using Surfactants to Formulate VOC Compliant Waterbased Inks" Am. Ink Maker 1994, 72 (2) 32–38.

*Primary Examiner*—Vasu Jagannathan
*Assistant Examiner*—Callie E Shosho
*Attorney, Agent, or Firm*—Russell L. Brewer

[57] ABSTRACT

This invention provides water-based compositions, particularly coating, ink, and agricultural compositions, manifesting reduced equilibrium and dynamic surface tension by the incorporation of a surface tension reducing amount of certain alkylated polyamine compounds of the structure

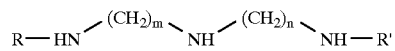

where m is 2–6, n is 2 or 3, R and R' are C5 to C8 alkyl groups.

18 Claims, No Drawings

SURFACE TENSION REDUCTION WITH ALKYLATED POLYAMINES

FIELD OF THE INVENTION

The invention relates to the use of alkylated polyamines to reduce the surface tension in water-based systems.

BACKGROUND OF THE INVENTION

The ability to reduce the surface tension of water is of great importance in waterborne coatings, inks, adhesives, and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying of coatings or agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO) propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

The objective of this invention is to provide a family of surfactants which provide good equilibrium and dynamic surface tension properties and are low-foaming and thus would be widely accepted in the coating, ink, adhesive, and agricultural formulation industries.

The importance of reducing equilibrium and dynamic surface tension in applications such as coatings, inks, and agricultural formulations is well-appreciated in the art.

Low dynamic surface tension is of great importance in the application of waterborne coatings. In an article, [Schwartz, J. "The Importance of Low Dynamic Surface Tension in Waterborne Coatings", Journal of Coatings Technology, September 1992] there is a discussion of surface tension properties in waterborne coatings and a discussion of dynamic surface tension in such coatings. Equilibrium and dynamic surface tension were evaluated for several surface active agents including the ethylene oxide adducts of acetylenic glycols. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, [Wirth, W.; Storp, S.; Jacobsen, W. "Mechanisms Controlling Leaf Retention of Agricultural Spray Solutions"; Pestic. Sci. 1991, 33, 411–420], the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article "Using Surfactants to Formulate VOC Compliant Waterbased Inks" [Medina, S. W.; Sutovich, M. N. Am. Ink Maker 1994, 72 (2), 32–38]. In this article, it is stated that equilibrium surface tensions (EST's) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

Although there have been numerous references to alkylated polyamines, it has not been recognized that such materials have the ability to reduce dynamic surface tension of aqueous solutions while contributing little foam to the system. This combination of properties would be of value in water-based coatings, inks, adhesives, and agricultural formulations. The following patents and publications relate to alkylated polyethyleneamines and their applications:

U.S. Pat. No. 4,126,640 and U.S. Pat. No. 4,195,152 disclose N-(C5–C8)alkyl polyamines, e.g., MIBK and MIAK reductive alkylates of diethylenetriamine:

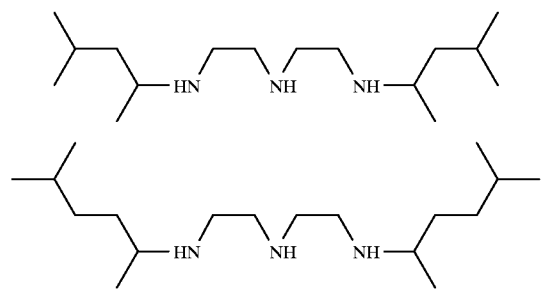

These materials are noted to be useful as curatives in high solids epoxy coatings because of their very low viscosity. Other suggested uses are in potting compositions, laminations, and adhesives.

Y. Murata and M. J. Ueda, Antibact. Antifung. Agents 1989, 17 (8), 371–375 disclose trihydrochlorides of N,N"-dialkyldiethylenetriamines of the form

where R is a linear C8 or C10 alkyl group have been shown to have antimicrobial properties against dental plaque bacteria. This study showed that in vitro bactericidal activity tended to increase with the length of the N-substituted alkyl chain. These workers suggested that this phenomenon may mean that each compound acts as a cationic surfactant. There is no suggestion that these materials should be effective at reducing dynamic surface tension. Furthermore, there is no suggestion that the free bases should have any effect reducing either equilibrium or dynamic surface tension.

SUMMARY OF THE INVENTION

This invention provides water-based compositions containing an organic compound, particularly organic coating, ink, and agricultural compositions, having reduced equilibrium and dynamic surface tension by incorporation of an effective amount of an alkylated polyamine compound of the following structure:

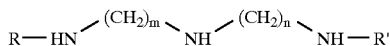

where m is 2–6, n is 2 or 3, and R and R' are C5 to C8 alkyl groups.

Also provided is a method for applying a water-based organic compound-containing composition to a surface, especially to partially or fully coat the surface with the water-based composition, the composition containing an effective amount of an alkylated polyamine compound of the above structure for reducing the dynamic surface tension of the water-based composition.

There are significant advantages associated with the use of these alkylated polyamines in water-based organic coatings, inks, and agricultural compositions and these advantages include:

- an ability to formulate water-borne coatings, inks, and agricultural compositions which may be applied to a variety of substrates with excellent wetting of substrate surfaces including contaminated and low energy surfaces;
- an ability to provide a reduction in coating or printing defects such as orange peel and flow/leveling deficiencies;
- an ability to produce water-borne coatings and inks which have low volatile organic content, thus making these surfactants environmentally favorable;
- an ability to formulate coating and ink compositions capable of high speed application;
- an ability to formulate compositions which retain dynamic surface tension properties under strongly basic, high temperature environments.

Because of their excellent surfactant properties and low foam characteristics, these materials are likely to find applicability in many applications in which reduction in dynamic and equilibrium surface tension and low foam are important. Such applications include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to the use of compounds of the formula

where m is 2–6, n is 2 or 3, and R and R' are C5 to C8 alkyl groups, with m being 2 or 3 preferred, for the reduction of equilibrium and dynamic surface tension in water-based compositions containing an organic compound, particularly coating, ink, and agricultural compositions. It is desirable that an aqueous solution of the alkylated polyamine demonstrates a dynamic surface tension of less than 45 dynes/cm at a concentration of $\leq 5$ wt % in water at 23° C. and 1 bubble/second according to the maximum-bubble-pressure method. The maximum-bubble-pressure method of measuring surface tension is described in *Langmuir* 1986, 2, 428–432, which is incorporated by reference.

The alkylated polyamines can be prepared by reductive alkylation of polyamines with aldehydes and ketones using well-established procedures. The essential aspects of the preparation are the reaction of an aldehyde or ketone with the polyamine to make an imine or enamine intermediate which then reacts with hydrogen in the presence of a suitable hydrogenation catalyst to form the corresponding saturated derivative.

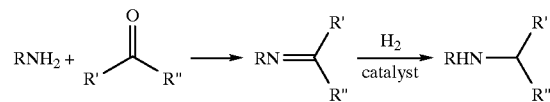

The imine or enamine derivative may be preformed or may be prepared in situ. The reductive alkylation procedure is the method of choice for the production of these materials, but the products may also be prepared by reaction of a polyamine derivative with an alkyl halide, or by reaction of a polyamine with an alcohol in the presence of a suitable catalyst, all being syntheses well known to an organic chemist.

Polyamine starting materials which are suitable for the preparation of the compounds of this invention include polyalkyleneamines, e.g., polyethyleneamines such as diethylenetriamine (DETA), and polypropyleneamines such as di-(3-aminopropyl)amine (DAPA), as well as mixtures containing substantial quantities of these materials which are commonly available. Polyamine starting materials containing three-carbon linking groups may be prepared by aminopropylation, i.e., by cyanoethylation of suitable diamines followed by hydrogenation:

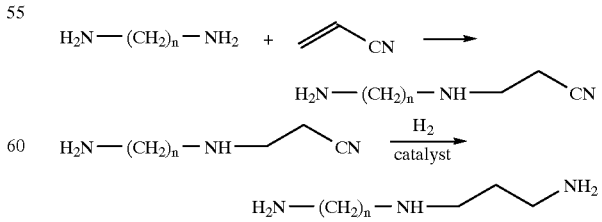

where n is 2–6.

Diamines suitable for the practice of the aminopropylation process include 1,2-ethylenediamine, 1,3- propanediamine, 1,2-propanediamine, 1,4-butanediamine, 1,5-pentanediamine, 2-methyl-1,5-pentanediamine, and 1,6-hexanediamine. Aminopropylation products prepared by reaction of more than one acrylonitrile with the starting diamine may also be suitable for the practice of this invention. Mixtures containing aminopropylated diamines with one, two, three, or four aminopropyl groups may also be suitable.

Alkyl groups which are suitable for use in this invention should have sufficient carbon atoms to confer surface activity (i.e. an ability to reduce the surface tension of water) to the material but not enough carbon atoms to decrease the solubility to the extent that the ability of the material to reduce surface tension is insufficient for a particular application. In general, an increase in the carbon number increases the efficiency of the resulting alkylated polyamine surfactant (i.e., less surfactant is required to obtain a given decrease in surface tension) but decreases its ability to reduce surface tension at high surface creation rates (i.e., less effective for reducing dynamic surface tension). The latter effect is a result of the fact that increased carbon number generally decreases the water solubility of the material, and consequently, diminishes the diffusive flux of surfactant to newly-created surface. Generally, in the practice of this invention, it is desirable to use alkylated polyamines having a solubility in water of at least 0.005 wt %, preferably from 0.01 to 2 wt %, and most preferably from 0.05 to 1.5 wt %.

The alkyl groups may be the same or different. They may be linear or branched, and the point of attachment to the nitrogen of the polyamine may be on either an internal or terminal carbon. Suitable alkyl groups are derived from reductive alkylation reactions of a C5 to C8 aldehyde or ketone, preferably derived from reductive alkylation reactions of methyl isobutyl ketone or methyl isoamyl ketone. Specific examples of suitable C5 to C8 aldehydes and ketones include 1-pentanal, 2-pentanone, 3-pentanone, methyl isopropyl ketone, 1-hexanal, 2-hexanone, 3-hexanone, methyl tert-butyl ketone, ethyl isopropyl ketone, 1-heptanal, 2-methylhexanal, 2-heptanone, 3-heptanone, 4-heptanone, 1-octanal, 2-octanone, 3-octanone, 4-octanone, 2-ethylhexanal, and so on. The specific carbonyl compound chosen and the number attached to the polyamine derivative will depend on the surfactant properties required for a particular application.

An amount of the alkylated polyamine compound that is effective to reduce the equilibrium and/or dynamic surface tension of the water-based, organic compound-containing composition is added. Such effective amount may range from 0.001 to 20 g/100 ml, preferably 0.01 to 2 g/100 ml, of the aqueous composition. Naturally, the most effective amount will depend on the particular application and the solubility of the alkylated polyamine.

In the following water-based organic coating, ink, and agricultural compositions containing an alkylated polyamine according to the invention, the other listed components of such compositions are those materials well known to the workers in the relevant art.

A typical water-based organic coating composition to which the alkylated polyamine surfactants of the invention may be added would comprise the following components in an aqueous medium at 30 to 80% solids:

| Typical Water-Based Organic Coating Composition | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvents |
| 0.01 to 10 wt % | Surfactant/Wetting Agent/Flow and Leveling Agents |
| 0.01 to 5 wt % | Alkylated Polyamine |

A typical water-based ink composition to which the alkylated polyamine surfactants of the invention may be added would comprise the following components in an aqueous medium at 20 to 60% solids:

| Typical Water-Based Ink Composition | |
|---|---|
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing Solvents |
| 0.01 to 10 wt % | Surfactant/Wetting Agent |
| 0.01 to 10 wt % | Processing Aids/Defoamers/Solubilizing Agents |
| 0.01 to 5 wt % | Alkylated Polyamine |

A typical water-based agricultural composition to which the alkylated polyamine surfactants of the invention may be added would comprise the following components in an aqueous medium at 0.1 to 80% ingredients

| Typical Water-Based Agricultural Composition | |
|---|---|
| 0.1 to 50 wt % | Pesticide or Plant Growth Modifying Agent |
| 0.01 to 10 wt % | Surfactant |
| 0 to 5 wt % | Dyes |
| 0 to 20 wt % | Thickeners/Stabilizers/Co-surfactants/Gel Inhibitors/Defoamers |
| 0 to 25 wt % | Antifreeze |
| 0.1 to 50 wt % | Alkylated Polyamine |

EXAMPLE 1

This example illustrates the procedure for the preparation of the reductive alkylation product of diethylenetriamine and methyl isobutyl ketone (DETA/MIBK) having the following structure:

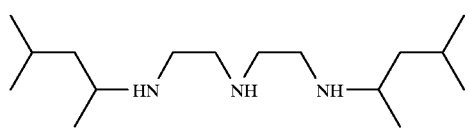

Diethylenetriamine (0.5 mole), methyl isobutyl Ketone (2.0 mole) and 5% Pd/C (4 wt % of total charge) were charged to a one liter stainless steel autoclave. The reactor was sealed and purged with nitrogen then hydrogen. The contents of the reactor were heated to 90° C. under 7 bar (100 psig) $H_2$. The pressure was increased to 55 bar (800 psig) and maintained throughout the reaction (9 hours) by the admission of hydrogen from a 1 gallon ballast on demand by a dome regulator. The reactor contents were analyzed by GC/FID and found to be 92.4 area % dialkylated and 2.7% trialkylated diethylenetriamine. The dialkylated product 2,4,12,14-tetramethyl-5,8,11-triazapentadecane was purified by distillation at 145–146° C., 6.6 millibar (5 Torr).

EXAMPLE 2

This example illustrates the procedure for the preparation of the reductive alkylation product of diethylenetriamine and methyl isoamyl ketone (DETA/MIAK) having the following structure:

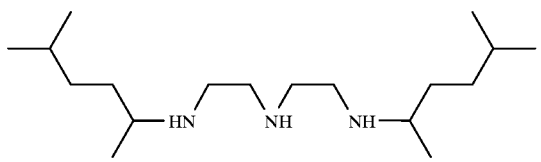

Diethylenetriamine (1.5 mole), methyl isoamyl ketone (3.2 mole) and 10% Pd/C (2.4 wt % of total charge) were charged to a one liter stainless steel autoclave and reacted as in Example 1 for 5 hours. The reactor contents were analyzed by GC/FID and found to be 92.4 area % dialkylated diethylenetriamine. The product 2,5,13,16-tetra-methyl-6,9,12-triazaheptadecane was purified by distillation at 155–157° C., 2.7 millibar (2 Torr).

EXAMPLE 3

This example illustrates the procedure for the preparation of the reductive alkylation product of di-(3-aminopropyl)amine and methyl isobutyl ketone (DAPA/MIBK) having the following structure:

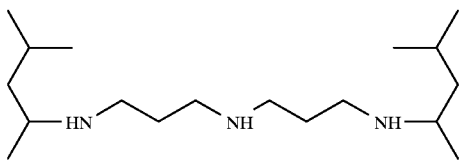

Di-(3aminopropyl)amine (0.8 mole), methyl isobutyl ketone (1.5 mole) and 10% Pd/C (4 wt % of total charge) were charged to a one liter stainless steel autoclave and reacted as in Example 1 for 6 hours. The reactor contents were analyzed by GC/FID and found to be 95.8 area % dialkylated di-(3-aminopropyl)amine. The product 2,4,14,16-tetramethyl-5,9,13-triazaheptadecane was purified by distillation at 125–130° C., 0.53 millibar (0.4 Torr).

In the following examples dynamic surface tension data were generated for aqueous solutions of the indicated compounds using the maximum-bubble-pressure method at the indicated bubble rates, i.e., bubbles/second (b/s), and room temperature of about 23° C. The equipment used was a Krüss BP 2 bubble pressure tensiometer.

Comparative Example 4

An aqueous solution of the trihydrochloride of DETA/MIBK (Example 1) was prepared by adding 0.3089 g of the triamine, 99.64 g of water, and 0.3251 g of 37% HCl to a suitable container. The molar ratio of triamine to HCl used in this example was 1:3; that is, sufficient acid was added to neutralize all of the amine groups present.

Dynamic surface tension data were obtained for a 0.3 wt % aqueous solution of the trihydrochloride using the maximum bubble pressure method at bubble rates from 0.1 to 20 b/s. These data provide information about the performance of a surfactant at conditions from near-equilibrium (0.1 b/s) through extremely high surface creation rates (20 b/s). In practical terms, high bubble rates correspond to high printing speeds in lithographic or ink-jet printing, high spray or roller velocities in coating applications, and rapid application rates for agricultural products. The data are set forth in Table 1.

TABLE 1

| | DETA-MIBK Trihydrochloride | | | | |
|---|---|---|---|---|---|
| | Dynamic Surface Tension (dyne/cm) | | | | |
| Concentration | 0.1 b/s | 1 b/s | 6 b/s | 15 b/s | 20 b/s |
| 0.3 wt % | 71.1 | 71.5 | 72.0 | 72.5 | — |

The surface tensions of these solutions are indistinguishable from those of water. The poor ability of this material to reduce the surface tension of water was surprising based upon the work of Murata which states that similar trihydrochlorides may function as cationic surfactants.

EXAMPLE 5

Solutions in distilled water of the reductive alkylation product of diethylene-triamine and methyl isobutyl ketone (DETA/MIBK; Example 1) were prepared and their dynamic surface tension properties were measured using the procedure described above. The data are set forth in Table 2.

TABLE 2

| | DETA-MIBK. | | | | |
|---|---|---|---|---|---|
| Concentration | Dynamic Surface Tension (dyne/cm) | | | | |
| (wt %) | 0.1 b/s | 1 b/s | 6 b/s | 15 b/s | 20 b/s |
| 0.106 | 37.5 | 38.5 | 39.0 | 39.8 | 40.0 |
| 0.215 | 32.7 | 34.1 | 34.9 | 35.5 | 35.6 |
| 0.302 | 29.7 | 31.5 | 32.3 | 32.6 | 32.9 |

These results show that at a concentration of 0.1 wt %, the surface tension at 0.1 b/s was 37.5 dyne/cm and, at the high surface creation rate of 20 b/s, the surface tension of the solution of the compound of Example 1 was 40.0 dyne/cm. That these materials had surface activity would not be anticipated based on the teachings of the prior art. Furthermore, it is surprising that the performance of these materials was so good under dynamic conditions.

The solubility limit of the reductive alkylation product of DETA and MIBK was 0.3 wt %. This means that if lower surface tension is required for a specific application, additional material may be added to the formulation; at a concentration of 0.3 wt %, the surface tension was less than 30 dyne/cm. Furthermore, even at 20 b/s, the surface tension of a 0.3 wt % solution of DETA/MIBK was 32.9 dyne/cm. The enhanced performance at these high surface creation rates could be extremely important in obtaining high printing speeds or application rates for water-based coating, ink, and agricultural formulations.

EXAMPLE 6

Solutions in distilled water of the reductive alkylation product of diethylene-triamine and methyl isoamyl ketone (DETA/MIAK; Example 2) were prepared and their dynamic surface tension properties were measured using the procedure described above. The data are set forth in Table 3.

TABLE 3

DETA/MIAK.

Dynamic Surface Tension (dyne/cm)

| Concentration | 0.1 b/s | 1 b/s | 6 b/s | 15 b/s | 20 b/s |
|---|---|---|---|---|---|
| 0.05 wt % | 30.9 | 32.2 | 35.1 | 40.7 | 41.9 |

The lower amounts of this material which are required to provide a good reduction in surface tension would have a positive impact on the economics of coating, ink, and agricultural formulations. Furthermore, use of lower surfactant quantities would also reduce emissions of volatile organic compounds from these formulations.

EXAMPLE 7

Solutions in distilled water of the reductive alkylation product of di-3(-amino-propyl)amine and methyl isobutyl ketone (DAPA/MIBK; Example 3) were prepared and their dynamic surface tension properties were measured using the procedure described above. The data are set forth in Table 4.

TABLE 4

DAPA/MIBK.

| Concentration | Dynamic Surface Tension (dyne/cm) | | | | |
|---|---|---|---|---|---|
| (wt %) | 0.1 b/s | 1 b/s | 6 b/s | 15 b/s | 20 b/s |
| 0.1 | 36.5 | 37.1 | 38.0 | 39.5 | 39.8 |
| 0.2 | 32.3 | 32.8 | 33.5 | 34.5 | 34.8 |
| 0.5 | 29.3 | 29.5 | 29.6 | 30.6 | 30.6 |

These results show that at a use level of 0.2 wt % in water DAPA/MIBK provided good performance at high surface creation rates. Also, since it has a relatively high solubility, it can be used at levels sufficient to bring about high performance. This example also illustrates that a three carbon linking group is also suitable for use in this invention.

EXAMPLE 8

The foaming properties of 0.1 wt % solutions of the reductive alkylation products of diethylenetriamine with methyl isobutyl ketone and methyl isoamyl ketone (Examples 1 and 2, respectively) were examined using a procedure based upon ASTM D 1173 - 53. In this test, a 0.1 wt % solution of the surfactant is added from an elevated foam pipette to a foam receiver containing the same solution. The foam height is measured at the completion of the addition ("Initial Foam Height") and the time required for the foam to dissipate is recorded ("Time to 0 Foam"). This test provides a comparison between the foaming characteristics of various surfactant solutions. In general, in coatings, inks, and agricultural formulations, foam is undesirable because is complicates handling and can lead to coating and print defects, and to inefficient application of agricultural materials.

TABLE 5

| Compound | Initial Foam Height (cm) | Time to 0 Foam |
|---|---|---|
| DETA/MIBK | 0.7 | 7 s |
| DETA/MIAK | 0.5 | 1 s |

The data in Table 5 show that the compounds of this invention form foam which dissipates quickly. Thus it would be expected that these materials would have the requisite properties for use in coatings, inks and agricultural formulations.

The ability of a surfactant in aqueous systems to reduce surface tension under both equilibrium and dynamic conditions is of great importance in the performance of water-based coatings, inks, adhesives, and agricultural formulations. Low equilibrium surface tension allows the development of excellent properties subsequent to application. Low dynamic surface tension results in enhanced wetting and spreading under the dynamic conditions of application, resulting in more efficient use of the formulations and fewer defects. In waterborne coatings, inks, adhesives, and agricultural formulations, the formation of foam is generally undesirable because it complicates handling and can cause defects or result in inefficient application.

STATEMENT OF INDUSTRIAL APPLICATION

The invention provides material suitable for reducing the equilibrium and dynamic surface tension in water-based compositions.

We claim:

1. In a method for applying a water-based composition to a surface, the composition containing an organic compound and an effective amount of a surfactant for reducing the dynamic surface tension and the foaming of the composition, the improvement which comprises employing as the surfactant an alkylated polyamine of the structure

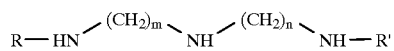

where m is 2–6, n is 2 or 3, and R and R' are C5 to C8 alkyl groups.

2. The method of claim 1 in which an aqueous solution of the alkylated polyamine demonstrates a dynamic surface tension of less than 45 dynes/cm at a concentration of ≦5 wt % in water at 23° C. and 1 bubble/second according to the maximum-bubble-pressure method.

3. The method of claim 2 in which m is 2 or 3.

4. The method of claim 2 in which m and n are 2.

5. The method of claim 2 in which the measurement is made at 20 bubbles/second.

6. The method of claim 1 in which the alkylated polyamine is the reductive alkylation product of diethylenetriamine and methyl isobutyl ketone.

7. The method of claim 1 in which the alkylated polyamine is the reductive alkylation product of diethylenetriamine and methyl isoamyl ketone.

8. The method of claim 1 in which the alkylated polyamine is the reductive alkylation product of di-(3-aminopropyl)amine and methyl isobutyl ketone.

9. An aqueous composition comprising an organic compound and an effective amount of an alkylated polyamine for reducing the dynamic surface tension and the foaming of the composition, the alkylated polyamine having a structure according to the formula:

where m is 2–6, n is 2 or 3, and R and R' are C5 to C8 alkyl groups.

10. The composition of claim 9 in which an aqueous solution of the alkylated polyamine demonstrates a dynamic surface tension of less than 45 dynes/cm at a concentration of $\leq 5$ wt % in water at 23° C. and 1 bubble/second according to the maximum-bubble-pressure method.

11. The composition of claim 10 in which m is 2 or 3.

12. The composition of claim 10 in which m and n are 2.

13. The composition of claim 9 in which the alkylated polyamine is the reductive alkylation product of diethylenetriamine and methyl isobutyl ketone.

14. The composition of claim 9 in which the alkylated polyamine is the reductive alkylation product of diethylenetriamine and methyl isoamyl ketone.

15. The composition of claim 9 in which the alkylated polyamine is the reductive alkylation product of di-(3-aminopropyl)amine and methyl isobutyl ketone.

16. The composition of claim 9 which is an organic coating composition of 30 to 80 wt % components, which components comprise 0 to 50 wt % pigment dispersant, grind resin or mixtures thereof;

0 to 80 wt % coloring pigment, extender pigment, anti-corrosive pigment, other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvents;

0.01 to 10 wt % surfactant, wetting agent, flow and leveling agents or mixtures thereof; and 0.01 to 5 wt % alkylated polyamine.

17. The composition of claim 9 which is an ink composition of 20 to 60 wt % components, which components comprise 1 to 50 wt % pigment;

0 to 50 wt % pigment dispersant, grind resin or mixtures thereof;

0 to 50 wt % clay base in a resin solution vehicle;

5 to 99 wt % water-borne, water-dispersible or water-soluble resin or mixtures thereof;

0 to 30 wt % coalescing solvent;

0.01 to 10 wt % processing aid, defoamer, solubilizing agent or mixtures thereof;

0.01 to 10 wt % surfactant, wetting agent or mixtures thereof; and 0.01 to 5 wt % alkylated polyamine.

18. The composition of claim 9 which is an agricultural composition of 0.1 to 80 wt % components, which components comprise 1 to 50 wt % pesticide, plant growth modifying agent or mixtures thereof;

0 to 5 wt % dye;

0 to 20 wt % thickener, stabilizer, co-surfactant, gel inhibitor, defoaming agent or mixtures thereof;

0 to 25 wt % antifreeze;

0 to 50 wt % coalescing or other solvents;

0.01 to 10 wt % surfactant; and 0.1 to 50 wt % alkylated polyamine.

* * * * *